US006901047B1

(12) United States Patent
Griffith et al.

(10) Patent No.: US 6,901,047 B1
(45) Date of Patent: May 31, 2005

(54) INTERNALLY COUPLED INPUT PATH REDUNDANCY

(75) Inventors: Paul S. Griffith, Wigan (GB); Kevin Jared Nolish, Pittsburgh, PA (US)

(73) Assignee: Marconi Intellectual Property (Ringfence), Inc., Pittsburgh, PA (US)

(*) Notice: Subject to any disclaimer, the term of this patent is extended or adjusted under 35 U.S.C. 154(b) by 848 days.

(21) Appl. No.: 09/866,950

(22) Filed: May 29, 2001

(51) Int. Cl.[7] .............................. H04J 1/16; H04J 3/14
(52) U.S. Cl. ....................................... 370/220; 370/228
(58) Field of Search ................................ 370/217, 219, 370/220, 221, 222, 227, 228, 242, 243–248, 338, 390; 714/2, 4, 6, 7, 13, 41

(56) References Cited

U.S. PATENT DOCUMENTS

| | | | | |
|---|---|---|---|---|
| 5,712,847 A | * | 1/1998 | Hata | 370/228 |
| 5,740,157 A | * | 4/1998 | Demiray et al. | 370/219 |
| 5,901,137 A | * | 5/1999 | Nakabayashi | 370/222 |
| 6,226,111 B1 | * | 5/2001 | Chang et al. | 398/9 |
| 6,359,858 B1 | * | 3/2002 | Smith et al. | 370/217 |
| 6,426,941 B1 | * | 7/2002 | Vaman et al. | 370/228 |
| 6,487,169 B1 | * | 11/2002 | Tada | 370/219 |
| 6,594,228 B1 | * | 7/2003 | Naidoo et al. | 370/217 |
| 6,657,952 B1 | * | 12/2003 | Shiragaki et al. | 370/223 |
| 6,687,217 B1 | * | 2/2004 | Chow et al. | 370/217 |
| 6,760,302 B1 | * | 7/2004 | Ellinas et al. | 370/228 |
| 2001/0015955 A1 | * | 8/2001 | Suzuki | 370/217 |
| 2003/0012134 A1 | * | 1/2003 | Ikawa | 370/227 |
| 2003/0043734 A1 | * | 3/2003 | Takeguchi | 370/216 |

* cited by examiner

*Primary Examiner*—Ajit Patel
*Assistant Examiner*—Chirag Shah
(74) *Attorney, Agent, or Firm*—Ansel M. Schwartz

(57) ABSTRACT

A communications network. The network includes a plurality of network elements connected by links along which data flows between the network elements, and which together protect against link failures between the network elements and failures of network elements which would otherwise disrupt the data flow between the network elements. The plurality of network elements include a first network element; a second network element; a third network element; and a fourth network element. The links include an active communications link connected between the first network element and the second network element along which the data travels, and a redundant communications link to the active communications link connected between the third network element and the fourth network element along which the data travels. The links include a first protective link connected between the second network element and the fourth network element along which the data received by the second network element is retransmitted to the fourth network element. A method for transferring data on a telecommunications network.

16 Claims, 1 Drawing Sheet

INTERNALLY COUPLED INPUT PATH REDUNDANCY

FIELD OF THE INVENTION

The present invention is related to a communications network having path redundancy. More specifically, the present invention is related to a communications network having internally coupled path redundancy.

BACKGROUND OF THE INVENTION

In most redundant network elements a single network element is connected to redundant communications links. While this protects against communications link failures, the network element itself remains a single point of failure. If redundancy of the network element itself is desired, to guard against hardware failures, then both must be processing the same inputs or some other mechanism must be provided to synchronize the network elements. The former solution requires complete duplication of the communications links, which may not be practical or may be costly, the latter requires a special purpose communications link between the network elements and may require additional hardware and its associated cost.

The present invention facilitates the construction of redundant capable smart devices that can maintain operation in the presence of both device hardware and communications input link failures. This device eliminates the need for duplicate communications links, reduces the need for side channel network element communications channels to synchronize redundant network elements, and reduces the need for designing costly hardware synchronization methods into network elements that may not always be used in a redundant configuration.

SUMMARY OF THE INVENTION

The present invention pertains to a communications network. The network comprises a plurality of network elements connected by links along which data flows between the network elements, and which together protect against link failures between the network elements and failures of network elements which would otherwise disrupt the data flow between the network elements. The plurality of network elements include a first network element; a second network element; a third network element; and a fourth network element. The links include an active communications link connected between the first network element and the second network element along which the data travels, and a redundant communications link to the active communications link connected between the third network element and the fourth network element along which the data travels. The links include a first protective link connected between the second network element and the fourth network element along which the data received by the second network element is retransmitted to the fourth network element.

The present invention pertains to a method for transferring data on a telecommunications network. The method comprises the steps of sending the data from a first network element to a second network element along an active communications link. There is the step of sending the data from a third network element to a fourth network element along a redundant communications link to the active communications link. There is the step of sending the data from the second network element to the fourth network element along a first protective link, which protects against communications links failures between the network elements and failures of the network elements which would otherwise disrupt the data flow between the network elements.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
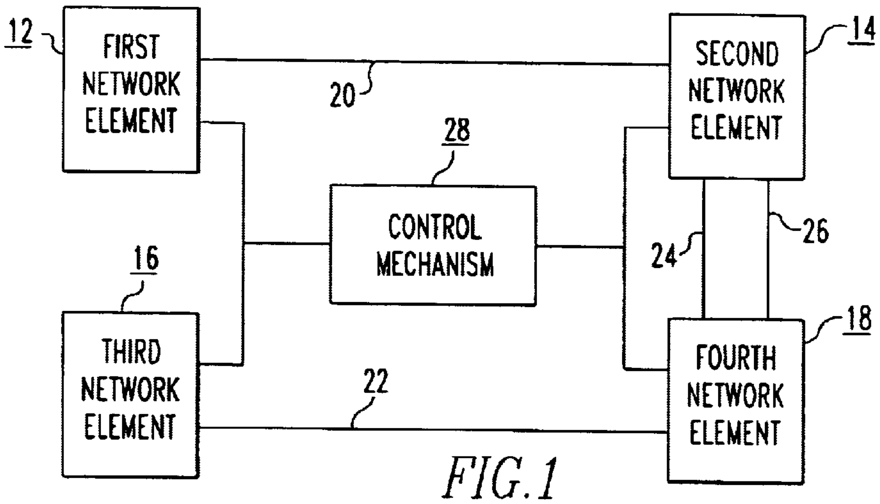
FIG. 1 is a schematic representation of a network of the present invention.

Referring now to the drawings wherein like reference numerals refer to similar or identical parts throughout the several views, and more specifically to FIG. 1 thereof, there is shown a communications network 10. The network comprises a plurality of network elements connected by links along which data flows between the network elements, and which together protect against link failures between the network elements and failures of network elements which would otherwise disrupt the data flow between the network elements. The plurality of network elements include a first network element 12; a second network element 14; a third network element 16; and a fourth network element 18. The links include an active communications link 20 connected between the first network element 12 and the second network element 14 along which the data travels, and a redundant communications link 22 to the active communications link 20 connected between the third network element 16 and the fourth network element 18 along which the data travels. The links include a first protective link 24 connected between the second network element 14 and the fourth network element 18 along which the data received by the second network element 14 is retransmitted to the fourth network element 18.

Preferably, the links include a second protective link 26 connected between the second network element 14 and the fourth network element 18 along which the data received by the fourth of network element is retransmitted to the second network element 14. The second network element 14 and the fourth network element 18 preferably duplicate the data they receive and retransmit it along the first protective link 24 and the second protective link 26, respectively.

Preferably, the network includes a control mechanism 28 connected to the network elements that selects the active communications link 20 to be a primary source of the data for the second network element 14 and the first protective link 24 as the primary source of the data for the fourth network element 18, wherein the data is synchronized at the second and fourth network elements 14, 18. The control mechanism 28, when the active communications link 20 fails, preferably reconfigures the second network element 14 to use as its primary source of the data the second protective link 26 and reconfigures the fourth network element 18 to use as its primary source of the data the redundant communications link 22.

Figure 2:
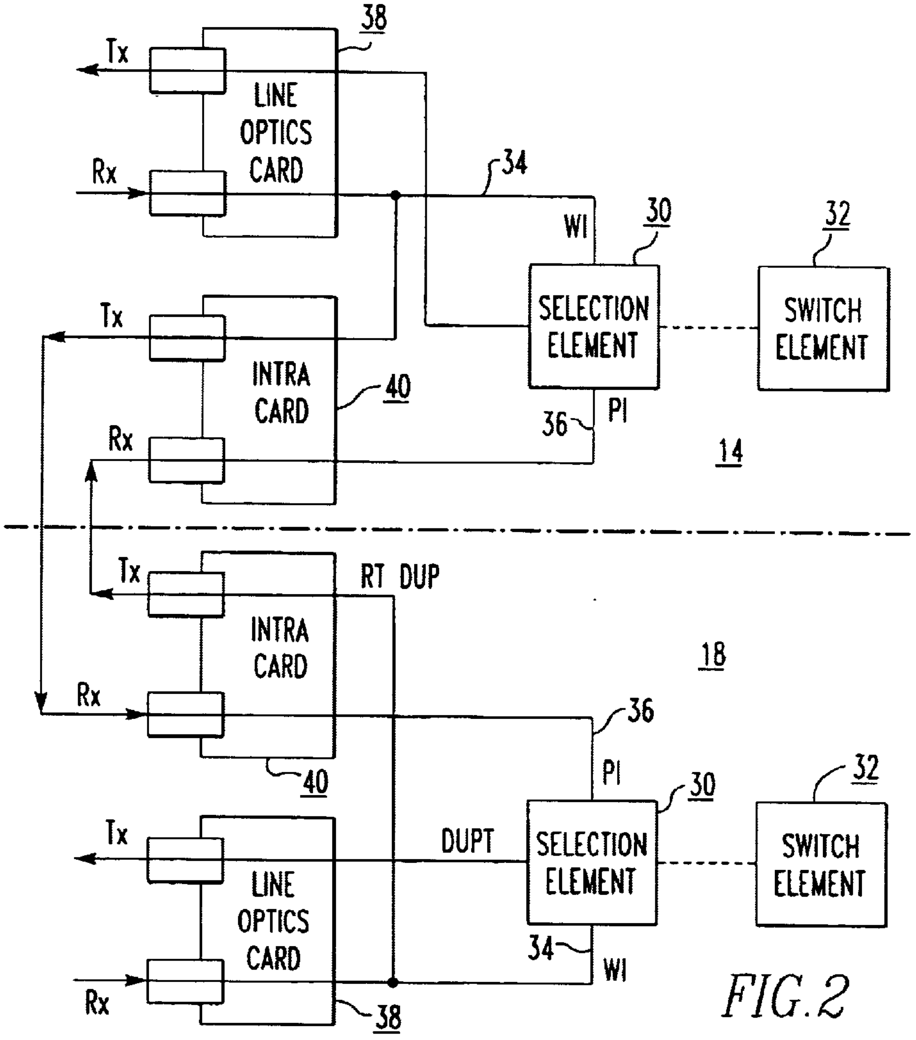
FIG. 2 is another schematic representation of the network of the present invention.

Preferably, the fourth network element 18 switches its primary source of the data from the first protective link 24 to the redundant communications link 22 upon instructions from the system controller or detection of failure of the second network element 14. Each network element preferably has a line optics card 38 connected to the respective communications link and the working input 34, and an intra card 40 connected to the respective protective link and the protected input 36, as shown in FIG. 2.

Preferably, each network element includes a redundant protected selection element 30 which receives the data, and a switch element 32 which processes the data. Each selection element 30 preferably has a working input 34 connected to the respective communications link on which it receives the data from the respective communications link, and a protected input 36 connected to the respective protective link on which it receives the data from the respective protective link. Preferably, each selection element 30 includes a sonet path that supports APS 1 plus 1 redundancy.

The present invention pertains to a method for transferring data on a telecommunications network. The method comprises the steps of sending the data from a first network element 12 to a second network element 14 along an active communications link 20. There is the step of sending the data from a third network element 16 to a fourth network element 18 along a redundant communications link 22 to the active communications link 20. There is the step of sending the data from the second network element 14 to the fourth network element 18 along a first protective link 24, which protects against communications links failures between the network elements and failures of the network elements which would otherwise disrupt the data flow between the network elements.

Preferably, there is the step of sending the data from the fourth network element 18 to the second network element 14 along a second protective link 26. The step of sending the data from the second network element 14 to the fourth network element 18 preferably includes the step of duplicating the data by the second network element 14 which the second network element 14 receives. The step of sending the data from the fourth network element 18 to the second network element 14 preferably includes the step of duplicating the data by the fourth network element 18 which the fourth network element 18 receives.

Preferably, there is the step of selecting by a control mechanism 28 connected to each of the network elements the active communications link 20 to be a primary source of the data for the second network element 14 and the first protective link 24 as the primary source of the data for the fourth network element 18, wherein the data is synchronized at the second and fourth network elements 14, 18. Preferably, there is the step of reconfiguring by the control mechanism 28 when the active communications link 20 fails the second network element 14 for the second network element 14 to use as its primary source of the data the second protective link 26 and reconfiguring the fourth network element 18 to use as its primary source of the data the redundant communications link 22. Preferably, there is the step of switching the primary source of the data of the fourth network element 18 from the first protective link 24 to the redundant communications link 22 upon receiving instructions from the system controller or detecting by the fourth network element 18 failure of the second network element 14.

In the operation of the invention, and referring to FIGS. 1 and 2, a system is comprised of redundant processing elements receiving data from redundant communications links 22. Additional links, called protection links, are connected between the redundant processing elements. Each element duplicates its received communication link information and retransmits it over protection links to other redundant elements. A control mechanism 28, such as a system controller, determines which communication link is to be considered the active communications link 20. The network element connected to the active communications link 20 selects this link as the source of its data stream. The redundant elements select the protection link as their data stream source. This guarantees that all processing elements operate upon the same communications link and thus remain synchronized without costly duplication of the communications links.

In the event of a communication link failure, the system controller reconfigures the network element attached to the failed link to take its data stream from its protection link and reconfigures the network element attached to the standby communications link to take its data stream from its communications link.

In the event of a hardware failure, the redundant element switches its data stream input from its protection input link to its communications link either upon explicit instruction from the system controller or upon detection of failure of its protection input. As the redundant element has been using the same data stream as the element it was protecting, synchronization issues are minimized. The monitoring diagnostics used to determine whether a link or element has failed is the same as that used in the 4000 switch sold by Marconi Communications, Inc. in Warrendale, Pa., and as is well known in the art. The selection element 30 can be the Lucent Supermapper Chip, or any redundant protected sonet path element commercially available.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A communications network comprising:

a plurality of network elements connected by links along which data flows between the network elements, and which together protect against link failures between the network elements and failures of network elements which would otherwise disrupt the data flow between the network elements, the plurality of network elements include a first network element; a second network element; a third network element; and a fourth network element; and wherein the links include an active communications link connected between the first network element and the second network element along which the data travels; and a redundant communications link to the active communications link connected between the third network element and the fourth network element along which the data travels, the links include a first protective link connected between the second network element and the fourth network element along which the data received by the second network element is retransmitted to the fourth network element.

2. A network as described in claim 1 wherein the links include a second protective link connected between the second network element and the fourth network element along which the data received by the fourth of network element is retransmitted to the second network element.

3. A network as described in claim 2 wherein the second network element and the fourth network element duplicate the data they receive and retransmit it along the first protective link and the second protective link, respectively.

4. A network as described in claim 3 including a control mechanism connected to the network elements that selects the active communications link to be a primary source of the data for the second network element and the first protective link as the primary source of the data for the fourth network element, wherein the data is synchronized at the second and fourth network elements.

5. A network as described in claim 4 wherein the control mechanism, when the active communications link fails, reconfigures the second network element to use as its primary source of the data the second protective link and reconfigures the fourth network element to use as its primary source of the data the redundant communications link.

6. A network as described in claim 5 wherein the fourth network element switches its primary source of the data from the first protective link to the redundant communications link upon instructions from the system controller or detection of failure of the second network element.

7. A network as described in claim 6 wherein each network element has a line optics card connected to the respective communications link and the working input, and an intra card connected to the respective protective link and the protected input.

8. A network as described in claim 7 wherein each network element includes a redundant protected selection element which receives the data, and a switch element which processes the data.

9. A network as described in claim 8 wherein each selection element has a working input connected to the respective communications link on which it receives the data from the respective communications link, and a protected input connected to the respective protective link on which it receives the data from the respective protective link.

10. A network as described in claim 9 wherein each selection element includes a sonet path that supports APS 1 plus 1 redundancy.

11. A method for transferring data on a telecommunications network comprising the steps of:

sending the data from a first network element to a second network element along an active communications link;

sending the data from a third network element to a fourth network element along a redundant communications link to the active communications link; and sending the data from the second network element to the fourth network element along a first protective link, which protects against communications links failures between the network elements and failures of the network elements which would otherwise disrupt the data flow between the network elements.

12. A method as described in claim 11 including sending the data from the fourth network element to the second network element along a second protective link.

13. A method as described in claim 12 wherein the step of sending the data from the second network element to the fourth network element includes the step of duplicating the data by the second network element which the second network element receives, and the step of sending the data from the fourth network element to the second network element includes the step of duplicating the data by the fourth network element which the fourth network element receives.

14. A method as described in claim 13 including the step of selecting by a system controller connected to each of the network elements the active communications link to be a primary source of the data for the second network element and the first protective link as the primary source of the data for the fourth network element, wherein the data is synchronized at the second and fourth network elements.

15. A method as described in claim 14 including the step of reconfiguring by the system controller when the active communications link fails the second network element for the second network element to use as its primary source of the data the second protective link and reconfiguring the fourth network element to use as its primary source of the data the redundant communications link.

16. A method as described in claim 15 including the step of switching the primary source of the data of the fourth network element from the first protective link to the redundant communications link upon receiving instructions from the system controller or detecting by the fourth network element failure of the second network element.

* * * * *

UNITED STATES PATENT AND TRADEMARK OFFICE

CERTIFICATE OF CORRECTION

PATENT NO. : 6,901,047 B1
APPLICATION NO. : 09/866950
DATED : May 31, 2005
INVENTOR(S) : Griffith et al.

It is certified that error appears in the above-identified patent and that said Letters Patent is hereby corrected as shown below:

Title Pg, Item (*) "Notice", delete "848" and insert -- 911 --, therefor.

Signed and Sealed this

Fourteenth Day of October, 2008

JON W. DUDAS
*Director of the United States Patent and Trademark Office*